(12) United States Patent
Gerritsen

(10) Patent No.: US 7,952,335 B2
(45) Date of Patent: May 31, 2011

(54) POWER CONVERTER AND METHOD FOR POWER CONVERSION

(75) Inventor: Steven Jan Gerritsen, Nijmegen (NL)

(73) Assignee: ST-Ericsson SA, Geneva (CH)

( * ) Notice: Subject to any disclaimer, the term of this patent is extended or adjusted under 35 U.S.C. 154(b) by 233 days.

(21) Appl. No.: 11/573,351

(22) PCT Filed: Jul. 29, 2005

(86) PCT No.: PCT/IB2005/052559
§ 371 (c)(1),
(2), (4) Date: Aug. 12, 2008

(87) PCT Pub. No.: WO2006/016319
PCT Pub. Date: Feb. 16, 2006

(65) Prior Publication Data
US 2008/0315849 A1      Dec. 25, 2008

(30) Foreign Application Priority Data
Aug. 9, 2004   (EP) .................................... 04103829

(51) Int. Cl.
*G05F 1/00*     (2006.01)
*H02M 3/156*    (2006.01)
*H03L 5/00*     (2006.01)

(52) U.S. Cl. ................... 323/282; 323/351; 327/333

(58) Field of Classification Search ............... 327/333; 323/282, 283, 297, 351; 363/127
See application file for complete search history.

(56) References Cited

U.S. PATENT DOCUMENTS

| | | | | |
|---|---|---|---|---|
| 5,825,239 A * | 10/1998 | Adal | ............................. | 327/563 |
| 6,154,031 A   | 11/2000 | Hughes | | |
| 6,469,482 B1 * | 10/2002 | Jahanshir et al. | ............. | 323/282 |
| 6,552,517 B1 * | 4/2003 | Ribellino et al. | ............. | 323/282 |
| 6,760,430 B2 * | 7/2004 | McGinn et al. | ............... | 379/322 |
| 2002/0075175 A1 | 6/2002 | Lin et al. | | |
| 2004/0051509 A1 | 3/2004 | Matsuo et al. | | |
| 2004/0174150 A1 * | 9/2004 | Zhang et al. | ................. | 323/274 |

FOREIGN PATENT DOCUMENTS

| | | |
|---|---|---|
| JP | 2001215913 A | 8/2001 |
| JP | 2002199702 A | 7/2002 |
| JP | 2004088956 A | 3/2004 |

* cited by examiner

*Primary Examiner* — Adolf Berhane
*Assistant Examiner* — Emily Pham

(57) ABSTRACT

The invention relates to a power converter for converting a first electrical power signal into a second electrical power signal having an output voltage Vout with a DC component comprising a control circuit (320) arranged for measuring the output voltage Vout and controlling the operation of the power converter in dependence thereof. The control circuit (320) comprises voltage level shifting means (326) for generating a measurement voltage signal V2 by adjusting the DC component of the output voltage Vout.

20 Claims, 6 Drawing Sheets

POWER CONVERTER AND METHOD FOR POWER CONVERSION

The invention relates to a power converter as described in the preamble of claim 1. The invention also relates to an integrated circuit comprising such a power converter and an apparatus comprising such a power converter. Furthermore the invention relates to a method for converting a first electrical power signal into a second electrical power signal as described in the preamble of claim 11.

Such a power converter is known in the art and is used to convert an electrical input power signal having an AC (alternating current) or DC (direct current) input voltage into an output power signal having an output voltage with a DC component. In for instance a battery supplied apparatus a DC/DC power converter or switched-mode power supply is used to convert a raw input voltage as supplied by a battery to a regulated output voltage. A switched-mode power supply comprises a power conversion circuit and a control circuit. The power conversion circuit converts the input voltage into the output voltage, while the control circuit measures the output voltage and adjusts it by controlling the operation of the power conversion circuit. The power conversion circuit comprises an arrangement of switches and passive components such as coils and capacitors and are well known in the art. Therefore these will not be discussed here in detail. Examples are disclosed in for instance the textbook "Principles of power electronics" by John G. Kassakian et al. The output voltage regulated by the control circuit may be higher or lower than the input voltage depending on the converter type. Usually the control circuit compares a measurement voltage that is derived from the output voltage with a predetermined reference voltage.

Conventionally the measurement voltage represents a fraction of the output voltage as it is derived by means of a resistive divider, although other ways for instance by using a transformer are also known. Usually a power converter is designed for a number of applications. Furthermore some types of apparatuses have a number of modes of operation requiring different output voltages It is therefore necessary that a switch-mode power supply can provide a range of output voltages. This is achieved in the conventional switched-mode power supply by adjusting the resistance of one of the resistors in the resistive divider or in case a transformer is used by changing the transformation ratio of the transformer.

From a system theoretical point of view the power conversion circuit together with the control circuit is a feedback system having a so-called control-loop. In a conventional DC/DC converter the loop-gain of the control-loop is dependent on the above discussed ratio of the resistive divider or the transformation ratio of the transformer. As discussed these ratios are usually not fixed but may vary depending on the application of the converter. As a consequence care must be taken in the design of a power converter that the feedback system remains stable for all possible ratios that may be obtained by means of the resistive divider. This complicates the design of the power converter. Furthermore in many control circuits a so-called control window is used rather than a single reference level with which the measurement voltage is compared. Having a variable ratio in the resistive divider, thus in the control-loop, results in a variable control window. This also complicates the design of the control circuit. Usually it also results in an output voltage ripple that scales with the DC component of the output voltage. Thus a higher DC level accompanied by a higher ripple on the output voltage.

Therefore it is inter alia an object of the invention to provide a power converter in which the loop-gain of the control-loop is independent of the output voltage setting thereby simplifying the design of the converter.

To this end the invention provides a power converter as defined in the opening paragraph which is characterized by the characterizing portion of claim 1 and a method for converting a first electrical power signal into a second electrical power signal as defined in the opening paragraph is characterized by the characterizing portion of claim 11. By level-shifting the output voltage a predetermined voltage is added to or subtracted from the output voltage. Thereby the DC component of the output voltage is adjusted. The resulting voltage is the measurement voltage that is used as an input by the control circuit to adjust the output voltage generated by the power converter. In this way the loop gain of the control loop is independent of the setting of the output voltage. Furthermore in case the control circuit uses a control window determined by a first reference voltage and a second reference voltage different from the first, the window is also constant for the whole output voltage range.

The above and other objects and features of the present invention will become more apparent from the following detailed description considered in connection with the accompanying drawings in which.

Figure 6A:
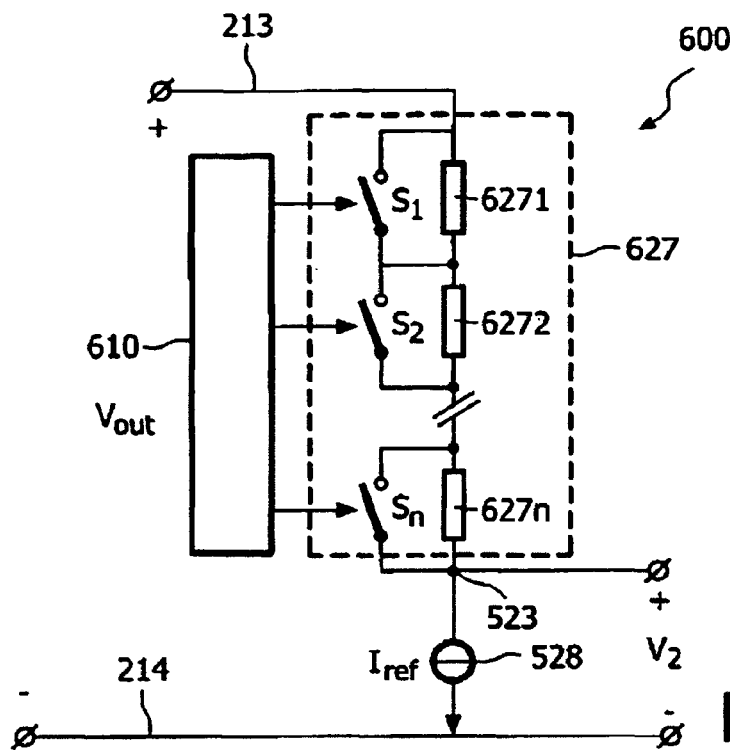
Figure 7:
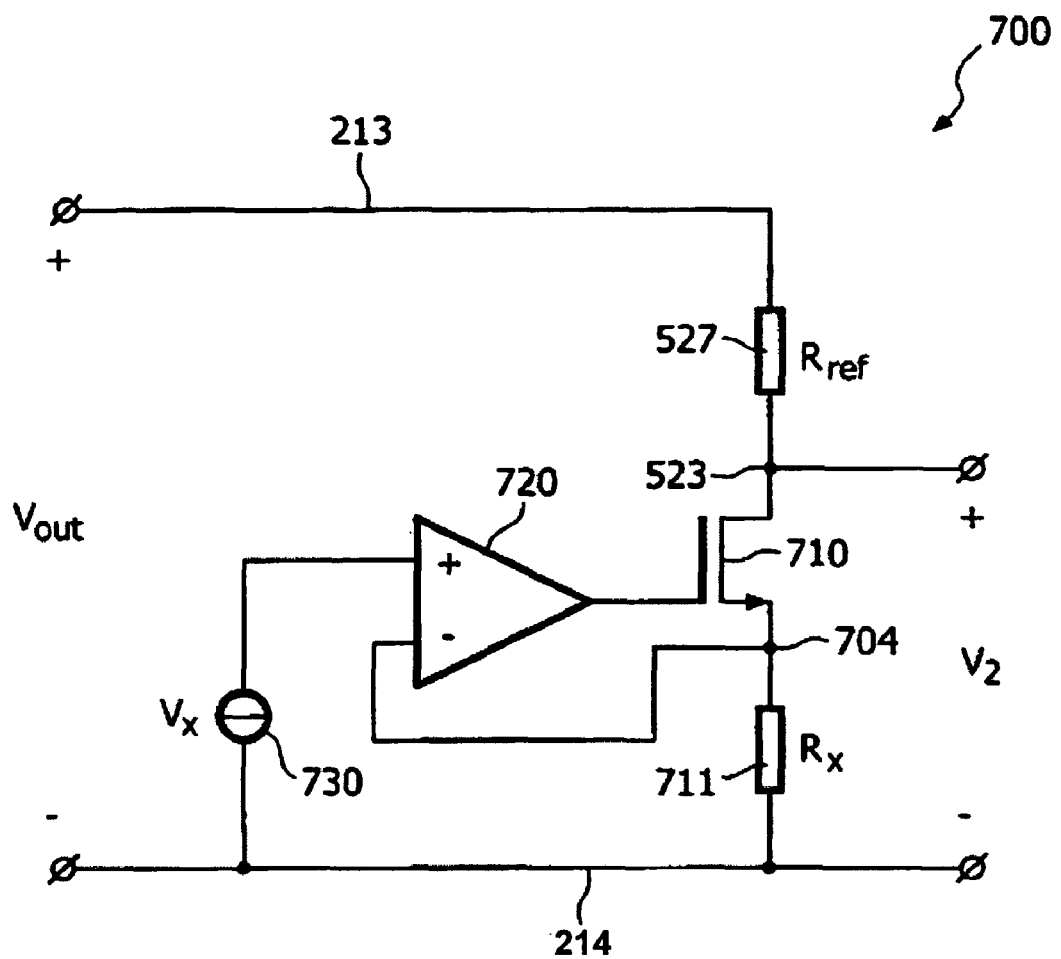
Figure 8:
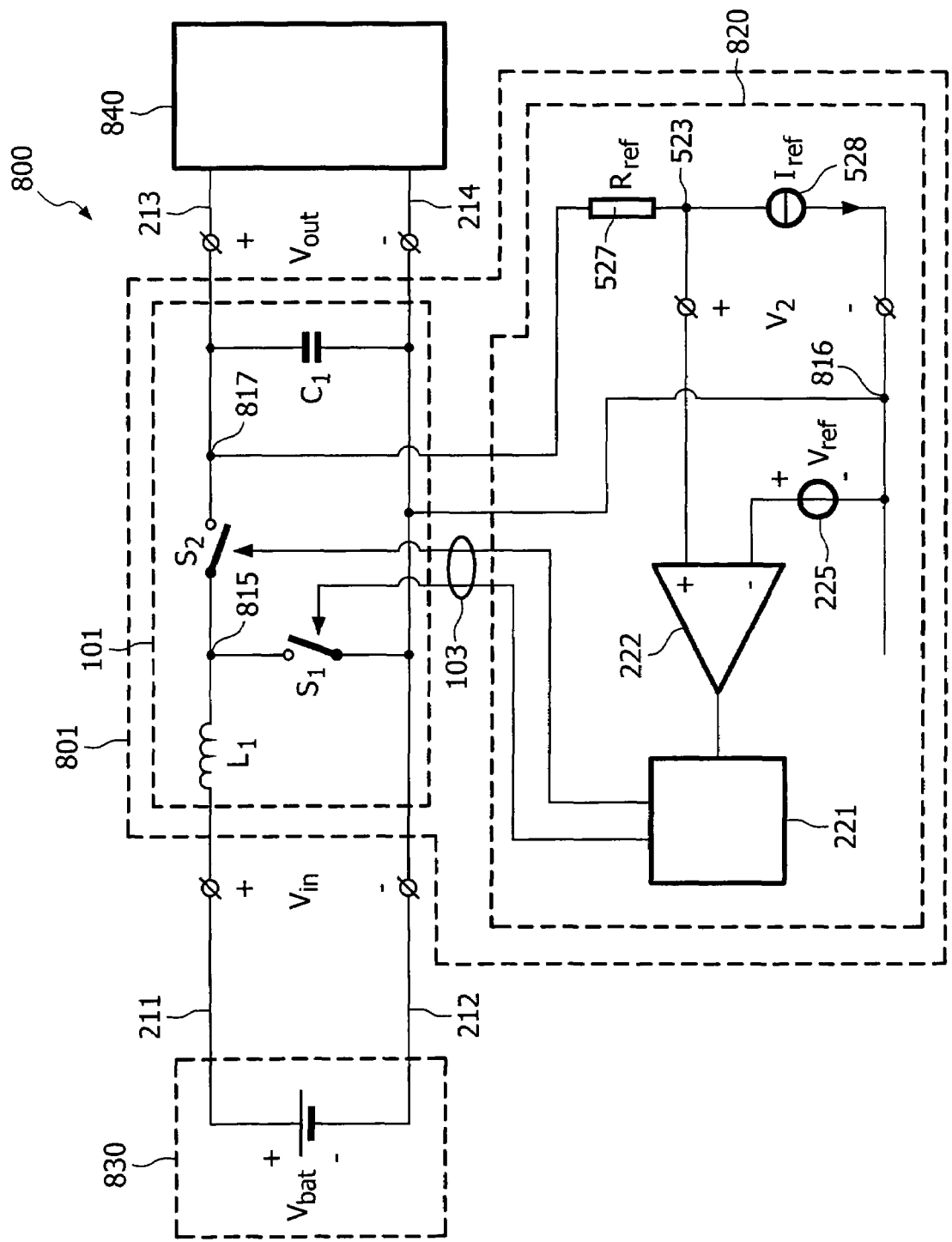

FIG. 6A, B show schematic diagrams of embodiments of voltage level shift circuits for a power converter according to the invention comprising adjustable resistors;

FIG. 7 shows a schematic diagram of an embodiment of an adjustable current source for a power converter according to the invention; and FIG. 8 shows a schematic diagram of an apparatus comprising a power converter according to the invention.

In these figures identical parts are in general identified with identical references.

Figure 1:
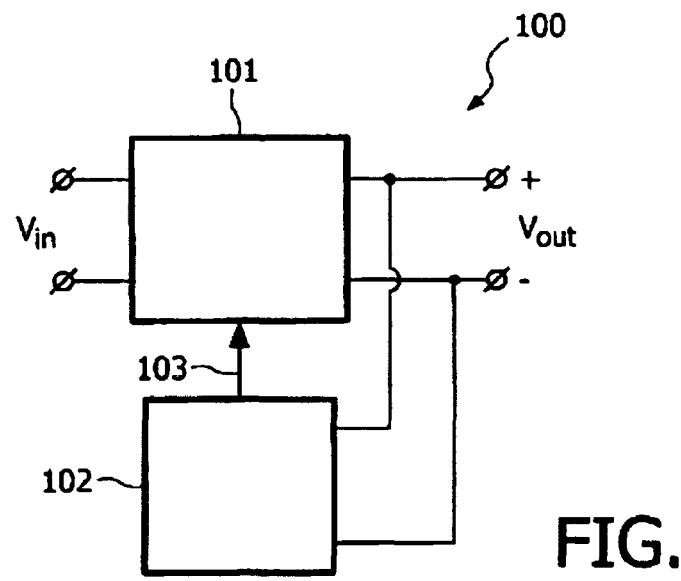
FIG. 1 shows a schematic diagram of a power converter.

FIG. 1 shows a schematic diagram of a power converter in general. The power converter 100 converts an electrical input power signal into an electrical output power signal. The power converter comprises a power conversion circuit 101 and a control circuit 102. The input power signal has a an input voltage Vin. The output power signal has an output voltage Vout with a DC component. The power conversion circuit 101 has an input for receiving the input power signal and an output at which the output power signal is generated. The power conversion circuit comprises an arrangement of switches and passive components, such as coils and capacitors. In general such power converters are also known as switch-mode power supplies. The circuit topology of the arrangement varies for different types of power converters and as such are known in the art. Therefore these will not be discussed here in detail. Examples are disclosed in for instance the textbook "Principles of power electronics" by John G. Kassakian et al. The operation of the switches is controlled by control circuit 102. The input voltage Vin may be an AC voltage in which case the power converter is commonly referred to as an AC/DC converter. Alternatively the input voltage Vin may be a DC voltage in which case the power converter is commonly referred to as DC/DC converter.

The control circuit 102 has an input for receiving the output voltage Vout. The control circuit 102 controls the operation of the power conversion circuit via control input 103 in dependence upon the output voltage Vout. The control circuit 102 is arranged to keep the output voltage Vout at a desired level, which may be predefined or adjustable based on the operation mode of the apparatus in which the power converter is applied. Alternatively the control circuit may be arranged to keep the output voltage within a certain window defined by a minimum voltage level and maximum voltage level.

Figure 2:
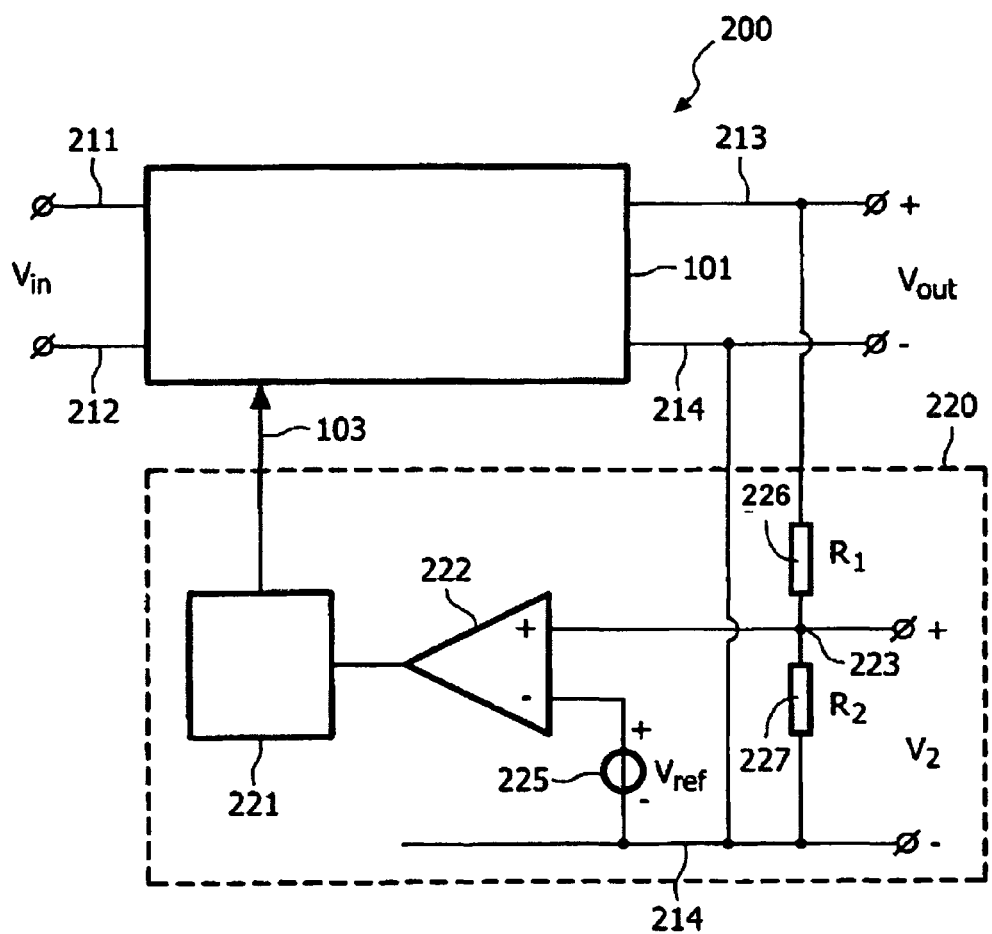
FIG. 2 shows a schematic diagram of a conventional power converter.

FIG. 2 shows more in detail a schematic diagram of a conventional power converter. The conventional power converter 200 comprises a power conversion circuit 101 and a control circuit 220. Power conversion circuit 101 has a first input terminal 211 and a second input terminal 212 for receiving an electrical input power signal having an input voltage Vin. Power conversion circuit 101 further comprises a first output terminal 213 and a second output terminal 214 for generating an electrical output power signal having an output voltage Vout with a DC component.

Control circuit 220 comprises a processor 221 having an input and an output, a comparator 222 having an output, a first non-inverting input and a second inverting input, a reference voltage source 225, a first resistor 226 having a value R1, and a second resistor 227 having a value R2. The output of controller 221 is coupled to control input 103 via which processor 221 controls the operation of the power conversion circuit 101. Furthermore the input of processor 221 is coupled to the output of the comparator 222. Reference voltage source 225 has a first terminal which is coupled to the inverting input of comparator 222 and a second terminal coupled to the second output terminal 214 of the power conversion circuit 210. Reference voltage source 225 applies a reference voltage Vref to the inverting input of comparator 222. Resistor 226 has a first terminal coupled to the first output terminal 213 of the power conversion circuit 210 and a second terminal coupled to an intermediate node 223. Resistor 227 has a first terminal coupled to intermediate node 223 and a second terminal coupled to the second output terminal 214 of power conversion circuit 210. Intermediate node 223 is further coupled to the non-inverting input of comparator 222.

The combination of resistor 226 and resistor 227 acts as a resistive divider. Measurement voltage V2 is generated over resistor 227 which is given by the following relation $$V2 = \frac{R2}{R1 + R2} \cdot Vout$$

V2 is therefore a fraction of Vout and scales with Vout. The loop gain of the control loop formed by control circuit 220 and power conversion circuit 210 is dependent on the ratio of the resistive divider. In many cases this will be a disadvantage, since usually a power converter is designed for a range of applications, whereby each application may have a different output voltage. Therefore the resistance ratio of the resistive divider will vary between applications. For this reason care must be taken that power converter remains stable for all values R1 and R2 of resistors 226 and 227 respectively. This complicates the design of control circuit 220. Also, in many digital control circuits a control window is used rather than a single reference voltage Vref. Having a variable gain in the due to the resistors results in a variable window size at the output terminals 213 and 214, whereby a window is defined in this case as range between a minimum output voltage and a maximum output voltage in which the output voltage of power converter 200 may vary. This complicates the design of the control circuit and results in an output voltage ripple that scales with the DC component of the output voltage Vout.

Figure 3:
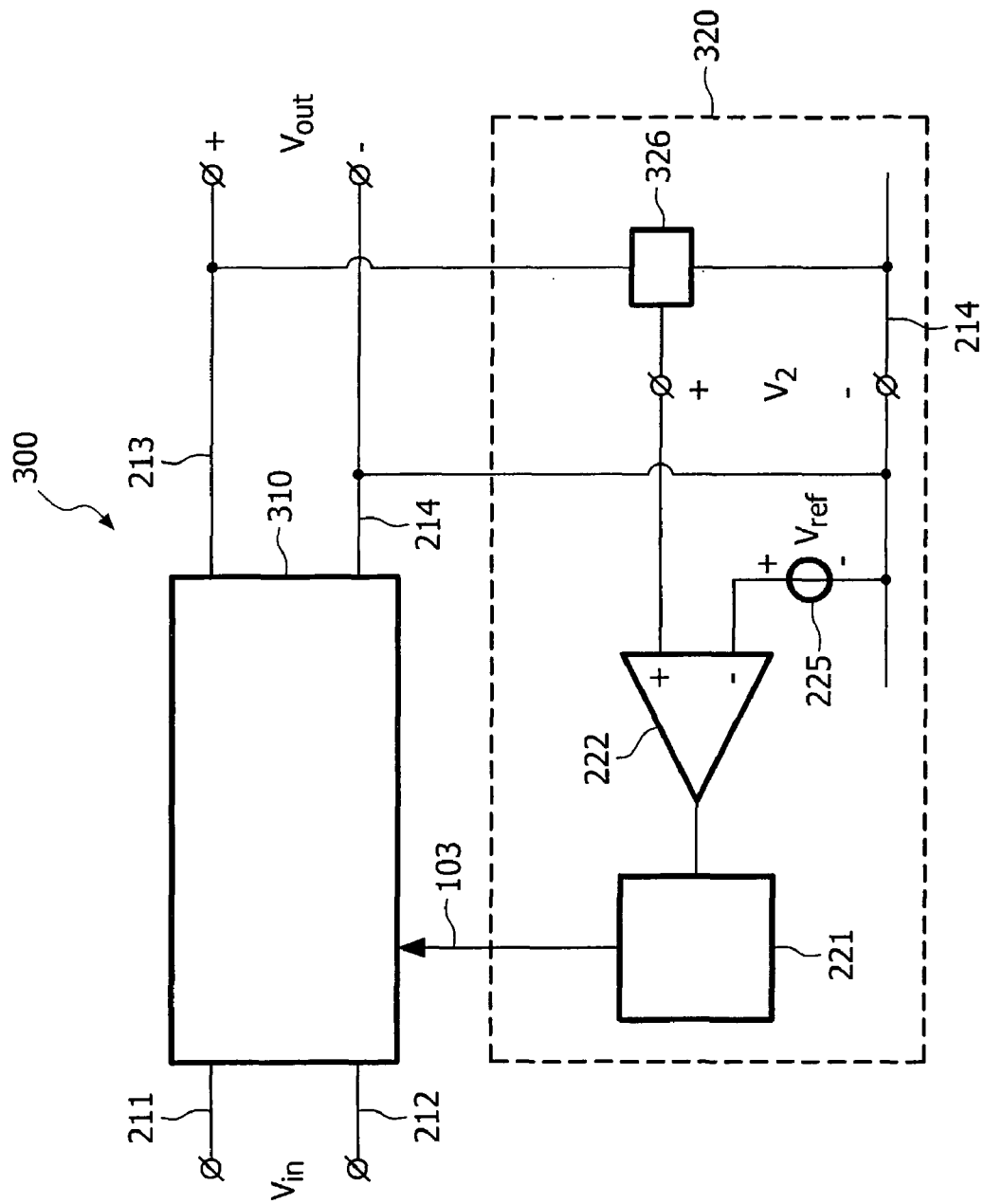
FIG. 3 shows a schematic diagram of an embodiment of a power converter according to the invention.

FIG. 3 shows a schematic diagram of an embodiment of a power converter according to the invention. The power converter 300 according to the invention comprises power conversion circuit 101 and a control circuit 320.

Control circuit 320 comprises processor 221, comparator 222, reference voltage source 225, and level shift circuit 326. Level shift circuit 326 has a first terminal that is coupled to the first output terminal 213 of power conversion circuit 101, a second terminal that is coupled to the second output terminal 214 of power conversion circuit 101, and a third terminal that is coupled to the non-inverting input of comparator 222.

The measurement voltage V2 generated between the non-inverting input of comparator 222 and the second output terminal 214 is a level-shifted version of the output voltage Vout. This means that measurement voltage V2 is a copy of output voltage Vout having an adjusted DC component. In other words measurement voltage V2 is generated by adding a predetermined voltage to Vout or subtracting a predetermined voltage from Vout. Preferably a voltage equal to the difference between reference voltage Vref and the desired DC component of the output voltage is subtracted from the output voltage Vout. By using this method the DC level of the output voltage is determined by Vref and measurement voltage V2, which has a fixed offset with respect to the output voltage Vout, and is not a fraction of the output voltage as is the case with conventional power converter 200. Therefore the loop gain of the control loop is independent of the DC level of the output voltage. Also in case a window controller is used the window is constant for the whole range of output voltages that can be generated with the power converter.

Figure 4:
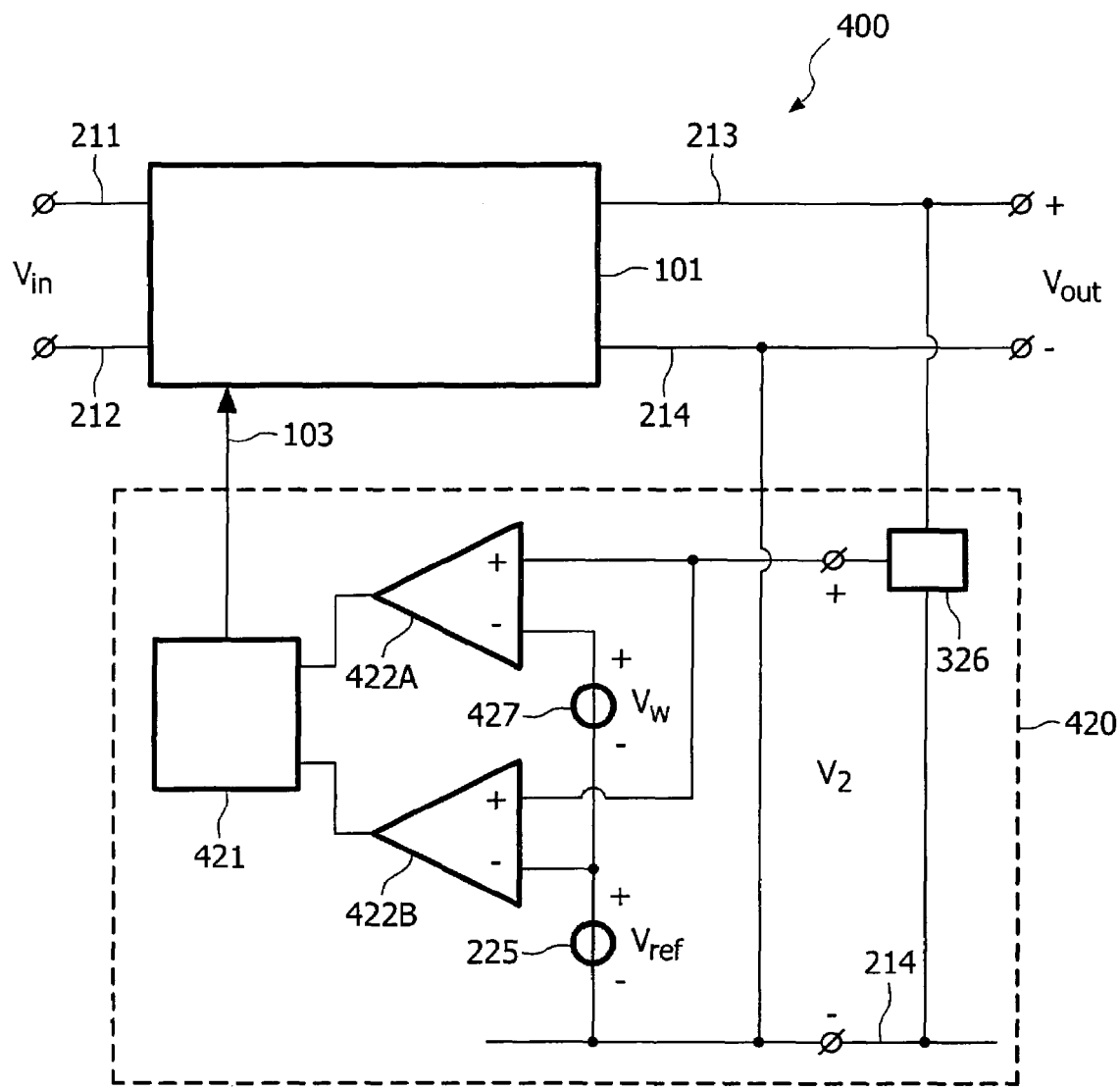
FIG. 4 shows a schematic diagram of another embodiment of a power converter according to the invention.

FIG. 4 shows a schematic diagram of another embodiment of a power converter according to the invention. The power converter 400 according to the invention comprises power conversion circuit 101 and control circuit 420.

Control circuit 420 comprises a processor 421 having a first input, a second input and an output, a first comparator 422A having an output, a first non-inverting input and a second inverting input, a second comparator 422B having an output, a first non-inverting input and a second inverting input, a reference voltage source 225, a window voltage source 427 generating a window voltage Vw, and level shift circuit 326. The output of processor 421 is coupled to control input 103 via which processor 421 controls the operation of the power conversion circuit 101. Furthermore the first input of processor 421 is coupled to the output of the first comparator 422A. The second input of processor 421 is coupled to the output of the second comparator 422B. Reference voltage source 225 has a first terminal which is coupled to the inverting input of the second comparator 422B and a second terminal coupled to the second output terminal 214 of the power conversion circuit 101. Reference voltage source 225 applies a reference voltage Vref to the inverting input of the second comparator 422B. Window voltage source 427 has a first terminal which is coupled to the inverting input of the first comparator 422A and a second terminal coupled to the first terminal of reference voltage source 225. Reference voltage source 225 and window voltage source 427 apply window voltage Vw plus reference voltage Vref to the inverting input of the first comparator 422A. Level shift circuit 326 has a first terminal that is coupled to the first output terminal 213 of power conversion circuit 101, a second terminal that is coupled to the second output terminal 214 of power conversion circuit 101, and a third terminal that is coupled to the non-inverting input of the first comparator 422A and the non-inverting input of the second comparator 422B.

As with the power converter shown in FIG. 3 the measurement voltage V2 generated between the third terminal of level shift circuit 326 and the second output terminal 214 is a level-shifted version of the output voltage Vout. Control circuit 420 is a so-called window controller. The window is a voltage range of which one side is defined by the reference level of the first comparator, which is Vref+Vw and the other by the reference level of the second comparator, which is Vref. The processor 421 is arranged to keep the output voltage Vout within a range that is derived from the voltage range defined by Vref and Vw. The output voltage window is independent of the DC component of Vout, because as mentioned above V2 has a predetermined offset to the output voltage Vout. This simplifies the design of control circuit 420.

Figure 5:
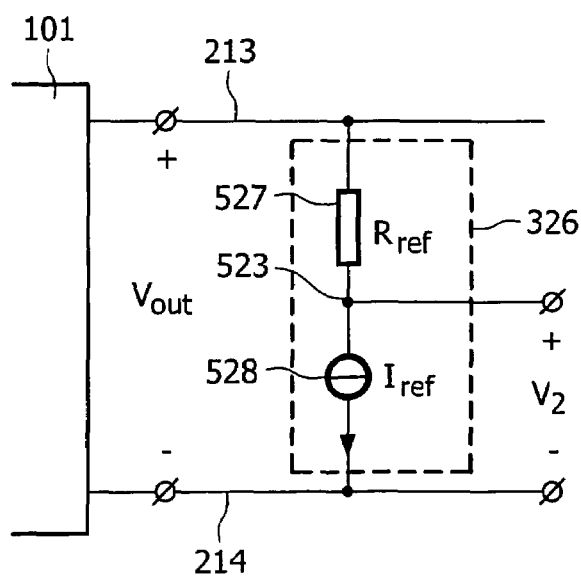
FIG. 5 shows a schematic diagram of an embodiment of a voltage level shift circuit for a power converter according to the invention.

FIG. 5 shows a schematic diagram of an embodiment of the voltage level shift circuit for a power converter according to the invention. The voltage level shift circuit 326 comprises a first terminal connected to a first output terminal 213 of power conversion circuit 101, a second terminal connected to a second output terminal 214 of power conversion circuit 101, and a third terminal which is connected to an internal node 523 of level shift circuit 326. Level shift circuit 326 comprises a reference resistor 527 having a value Rref and a current reference source 528 generating a reference current Iref. A first terminal of reference resistor 527 forms the first terminal of the level-shift circuit. A second terminal of 527 is coupled to internal node 523. A first terminal of current reference source 528 is coupled to internal node 523. A second terminal of current reference source 528 forms the second terminal of level shift circuit 326. The measurement voltage V2 present between the third terminal and the second output terminal 214 is a level shifted version of output voltage Vout present between the first output terminal 213 and the second output terminal 214.

Current reference source 528 generates predetermined reference current Iref which is constant. This current is drawn through reference resistor 527 thereby generating a constant voltage drop Iref·Rref over reference resistor 527, thus effectively this is a floating voltage source. The voltage drop is independent from the value of the output voltage Vout. Consequently the measurement voltage V2 is a level shifted version of output voltage Vout. Note that in principle reference current Iref may flow in either direction. Preferably the voltage drop generated over Rref equals the desired output voltage minus a reference voltage. The reference voltage may be for instance reference voltage Vref as generated by voltage reference source 225 shown in FIG. 3 and FIG. 4.

FIG. 6A, B show schematic diagrams of embodiments of voltage level shift circuits for a power converter according to the invention comprising adjustable resistors. In case the power converter is realized as an integrated circuit or as a part of an integrated circuit it is usually desirable that it is suitable for a range of applications having varying output voltages. For such an integrated power converter or DC/DC converter there are several options to modify the voltage that is added or subtracted from the output voltage, thereby keeping the measurement voltage V2 within the same range while the regulated output voltage is varied. As discussed in relation to FIG. 5 the voltage drop across reference resistor Rref preferably equals Voutdes minus Vref, whereby Voutdes is the desired output voltage and Vref a reference voltage, for instance the reference voltage used in the control circuits shown in FIG. 3 or FIG. 4. In this case the following relationship exists between the desired output voltage, the value Rref of reference resistor 527, and the value Iref of reference current source 528

$$Vout = Vref + Rref \cdot Iref$$

Thus assuming the Vref will be constant there are two options to change the desired output voltage, either by changing the resistance Rref of reference resistor 527 or by changing the value of reference current Iref. Which option turns out the most attractive will depend on requirements such as output voltage range and the options of the integrated circuit process in which the integrated DC/DC converter is realized. Reference resistor 527 may be either an internal, that is on-chip, resistor or an external, that is off-chip, component. If reference resistor 527 is an external component a simple way of changing the desired output voltage is by changing a resistor having a first resistance with a resistor having a second, different, resistance. An external reference resistor 527 may not be suitable for some applications, since it comes with the obvious expense of an additional external component that also requires two external terminals or pins on the integrated circuit. A further disadvantage is that the absolute value of reference current Iref generated with the current reference current source has to be accurately determined. Usually this requires an additional external resistor.

Figure 6B:
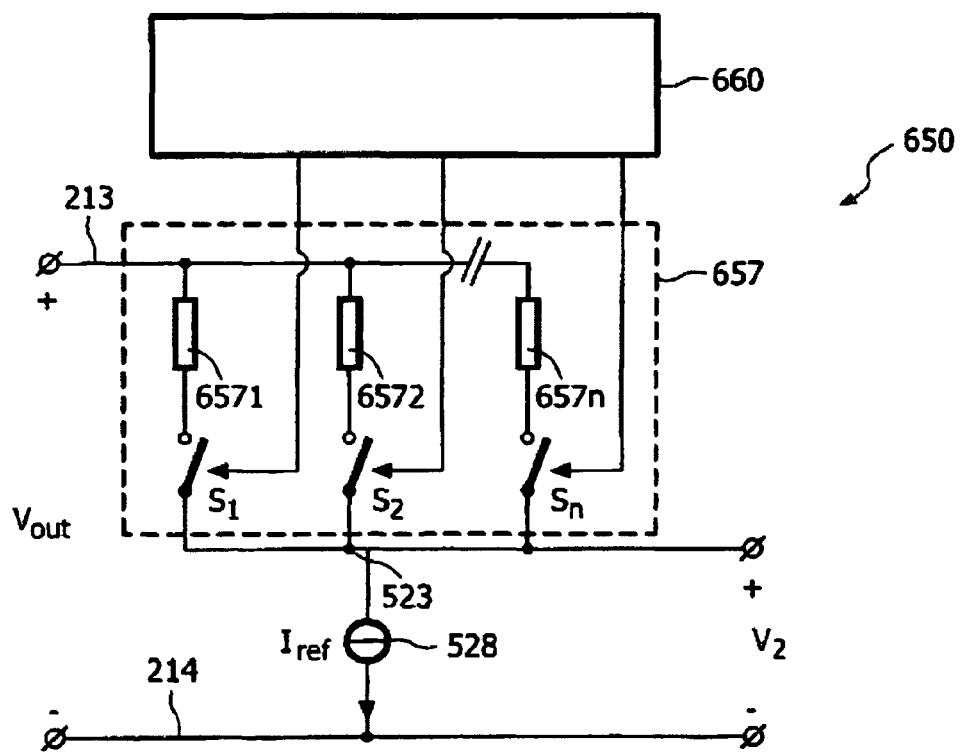

FIG. 6A and FIG. 6B show two ways in which a variable internal reference resistor Rref may be realized. FIG. 6A shows a schematic diagram of a level shift circuit 600 comprising an adjustable reference resistor 627 having an overall value Rref and current reference source 528 generating a reference current Iref. Reference resistor 627 has a first terminal connected to a first output terminal 213 of power conversion circuit 101 and a second terminal connected to internal node 523. Current reference source 528 comprises a first terminal connected to internal node 523 and a second terminal connected to second output terminal 214 of the power conversion circuit. Reference resistor 627 comprises a series connection of a plurality of resistive elements 6271, 6272, . . ., 627n, having resistances R1, R2, . . . , Rn respectively. Short circuit switches S1, S2, . . . , Sn are connected in parallel with the respective resistive elements. Under control of an output voltage setting circuit 610 each of the short circuit switches S1, S2, . . . , Sn may be opened or closed. If a short circuit switch is closed, the associated resistive element connected in parallel with it, is short circuited, thereby reducing the resistance of reference resistor 627. The more short circuit switches are closed the lower the resistance of reference resistor 627 will be.

FIG. 6B shows a schematic diagram of a level switch circuit 650 comprising an adjustable reference resistor 657 having a value Rref and current reference source 528 generating a reference current Iref. Reference resistor 657 has a first terminal connected to a first output terminal 213 of a power conversion circuit and a second terminal connected to an internal node 523. Current reference source 528 comprises a first terminal connected to internal node 523 and a second terminal connected to a second output terminal 214 of the power conversion circuit. The power conversion itself is not shown and may be the power conversion circuit shown in FIG. 3 or FIG. 4. Reference resistor 657 comprises a parallel connection of a plurality of resistive elements 6571, 6572, . . . , 657n having resistance values R1, R2, . . . , Rn respectively. Disconnection switches S1, S2, . . . , Sn are connected in series with the respective resistive elements. Under control of an output voltage setting circuit 660 each of the short circuit switches S1, S2, . . . , Sn may be opened or closed. If a short circuit switch is opened, the associated resistive element connected in series with it, is disconnected, thereby increasing the resistance of reference resistor 657. The more disconnection switches are opened the higher the resistance of reference resistor 657 will be.

It may be advantageous to have an adjustable reference resistor 657 if the range of possible output voltages is large. In such a situation making the current source variable will lead to either very small currents at the low end of the range or very high currents at the high end of the range.

FIG. 7 shows a schematic diagram of an embodiment of an adjustable current source for a power converter according to the invention. A level shift circuit 700 is an embodiment of the level shift circuit 326 shown in FIG. 5. The level shift circuit 700 comprises a reference resistor 527. This may also be one of the adjustable reference resistors of FIG. 6A or FIG. 6B. Furthermore the level shift circuit 700 comprises a transistor 710 having a main conductive path and a control electrode, a current adjustment resistor 711 having a resistance value Rx, an amplifier 720 having a first non-inverting input, a second inverting input and an output, and a voltage source 730.

A first terminal of reference resistor 527 is connected to a first output terminal 213 of a power conversion circuit. A second terminal of reference resistor 527 is connected to an internal node 523. The main conductive path of transistor 710 is connected between internal node 523 and another internal node 704. A first terminal of current adjustment resistor 711 is connected to internal node 704 and a second terminal is connected to the second output terminal 214 of the power conversion circuit. The non-inverting input of amplifier 720 is connected to a first terminal of voltage source 730. The inverting input of amplifier 720 is connected to internal node 704. A second terminal of voltage source 730 is connected to the second output terminal 214. The voltage source 730 generates a current adjustment voltage Vx. Note that the power conversion circuit is not shown.

In level shift circuit 700, a reference current Iref is generated by setting an accurate bandgap-derived current adjustment voltage Vx across current adjustment resistor 711 having the value Rx. Thereby Iref is defined by the following relation $$Iref = \frac{Vx}{Rx}$$

Thus the desired output voltage Voutdes is given by the following relation $$Voutdes = Vref + Rref \cdot \left(\frac{Vx}{Rx}\right)$$

In case the power converter is realized as an integrated circuit or as part thereof it may be advantageously to minimize the number of components adding to the inaccuracy of the circuit by deriving Vx from the reference voltage Vref that is used in the control circuit 320 or 420 shown in FIG. 3 and FIG. 4 respectively. Vref is usually a so-called bandgap reference voltage. Preferably Vx is equal to Vref/2. This can be achieved by using an accurate resistive voltage divider. In this case the desired output voltage level is given by the following relation $$Voutdes = Vref \cdot \left(1 + \frac{Rref}{2 \cdot Rx}\right)$$

Thus the accuracy of the desired output voltage Voutdes is determined by reference voltage Vref and the ratio of Rref and Rx. As stated above Vref is usually derived from a bandgap circuit which typically has an accuracy of about 1%. Although it is usually difficult to accurately determine a resistances in a typical IC process due to the large resistors that are required, the matching of two reasonably sized resistors typically has an accuracy of a few percent. Based on a typical accuracy of 1.5% in the ratio Rref/Rx the overall accuracy in Voutdes will be about 2%.

Even though the accuracy is quite good using on-chip resistors, sometimes it will be advantageous to realize Rref and Rx as accurate external off-chip resistors. In this case it is usually not required that Rref is an adjustable reference resistor as it is easily replicable.

FIG. 8 shows a schematic diagram of an apparatus comprising a power converter according to the invention. Examples of such apparatuses are digital still cameras, cellular phones, and other portable consumer electronics equipment.

Apparatus 800 comprises a battery 830 supplying a unregulated battery voltage Vbat, a power converter 801, and a load circuit 840 representing the electronic circuits powered by power converter 801. The shown power converter is a so-called up-converter for generating a DC output voltage Vout that is higher than an DC input voltage Vin. Power converter 801 comprises power conversion circuit 101 for the actual power conversion and control circuit 320 for controlling the operation of power conversion circuit 101. Power conversion circuit comprises first input terminal 211 connected to a first terminal of battery 830 and second input terminal 212 connected to a second terminal of battery 830. Power conversion circuit 801 comprises first output terminal 213 connected to a first terminal of load 840 and second output terminal 214 connected to a second terminal of load 840. Over input terminals 211 and 212 the DC input voltage Vin is applied, which is in the shown circuit equal to the battery voltage Vbat supplied by battery 830. Over output terminals 213 and 214 the regulated DC output voltage Vout is generated. Power conversion circuit 101 further comprises a first switch S1, a second switch S2 an inductor L1 and a buffer capacitor C1. Inductor L1 is connected between the first input terminal 211 and an internal node 815. First switch S1 is connected between internal node 815 and another internal node 816. Second switch S1 is connected between internal node 815 and another internal node 817. Capacitor C1 is connected between internal node 817 and internal node 816. Internal node 816 is connected to the second input terminal 212 and the second output terminal 214. Internal node 817 is connected to the first output terminal 213.

Control circuit 820 comprises processor 221, comparator 222, voltage reference source 225, current reference source 528, and reference resistor 527 having value Rref. Via control input 103 (in this example implemented as a two wire connection) an output of controller 221 is coupled to the switches S1 and S2. An input of controller 221 is connected to the output of comparator 222. Voltage reference source 225 is coupled between an inverting input of comparator 222 and internal node 816. A non-inverting input of comparator 222 is coupled to internal node 523. Reference resistor 527 is connected between internal node 817 and internal node 523.

Current reference source 528 is connected between internal node 523 and internal node 816.

In operation reference current source 528 generates a fixed reference current Iref. The non-inverting input of comparator 222 is high-ohmic, therefore reference current Iref will flow through reference resistor 527. As a result a level-shifted copy of output voltage Vout is generated between internal node 523 and internal node 816. Comparator 222 compares measurement voltage V2, the level-shifted copy of output voltage Vout, with reference voltage Vref. In dependence of this comparison processor 221 controls the operation of switches S1 and S2 of the power conversion circuit 101 via control input 103.

It may be advantageous to realize power converter 801, except for inductor L1 and buffer capacitor C1, as an integrated circuit or part of an integrated circuit. Usually the inductance of inductor L1 and the capacitance of capacitor C1 are too large to make realize these as integrated circuit components.

The embodiments of the present invention described herein are intended to be taken in an illustrative and not a limiting sense. Various modifications may be made to these embodiments by those skilled in the art without departing from the scope of the present invention as defined in the appended claims.

For instance FIG. 5 shows an embodiment of a voltage level shift circuit. This embodiment is particularly suitable in case the power converter is realized as an integrated circuit or as a part of an integrated circuit. The shown reference resistor through which a constant reference current is drawn is one way of realizing a floating voltage source. A person skilled in the art will know others which can be applied without departing from the scope of the invention.

In summary the invention relates to switched-mode power supplies, in particular DC/DC converters that require a voltage feedback. The approach is especially suited for integrated power converters that are intended to cover a wide range or output voltages, because the small signal gain will remain constant over the entire output voltage range. It is also suited for converters with digital controllers that use a control window, because the control window will be constant over the entire output voltage range.

The invention claimed is:

1. A power converter configured to receive a first electrical power signal and to generate a second electrical power signal, the second electrical power signal having a voltage with a DC component, the power converter comprising:
    a first output terminal and a second output terminal configured to deliver the voltage; and
    a control circuit configured to measure the voltage and to control operation of the power converter in accordance with a measurement voltage, the control circuit including
        a voltage level shifter configured to generate the measurement voltage by subtracting from the voltage a difference between a reference voltage and a desired output voltage to adjust the DC component of the voltage, and
        a comparator, wherein the voltage level shifter has a first terminal coupled to the first output terminal, a second terminal coupled to the second output terminal and a third terminal coupled to an input of the comparator.

2. A power converter as claimed in claim 1, wherein the voltage level shifter comprises:
    a resistor coupled between the first output terminal and an intermediate node; and
    a current source coupled between the intermediate node and the second output terminal, the current source configured to generate a reference current through the resistor,
    wherein the voltage level shifter is configured to generate the measurement voltage signal between the intermediate node and the second output terminal.

3. A power converter as claimed in claim 2, wherein the resistor comprises an adjustable resistance circuit configured to adjust a resistance of the resistor.

4. A power converter as claimed in claim 3, wherein the resistor comprises a plurality of resistive elements connected in series and the adjustable resistance circuit comprises short-circuit switches configured to selectively short-circuit resistive elements out of said plurality of resistive elements.

5. A power converter as claimed in claim 3, wherein the resistor comprises a plurality of resistive elements connected in parallel between the first output terminal and the intermediate node and the adjustable resistance circuit comprises disconnection switches configured to selectively disconnect resistive elements out of said plurality of resistive elements.

6. A power converter as claimed in claim 2, wherein the current source is configured to adjust the reference current.

7. A power converter as claimed in claim 6, wherein the current source comprises:
    a transistor having a control electrode and a main conductive path;
    an amplifier having a first input, a second input, and an output; and
    a current adjustment resistor having a first electrode and a second electrode, wherein:
        the first electrode of the current adjustment resistor is coupled to the intermediate node via the main conductive path of the transistor;
        the second electrode of the current adjustment resistor is coupled to the second output terminal;
        the output of the amplifier is coupled to the control electrode of the transistor;
        the first input of the amplifier is arranged for receiving a current adjustment voltage; and
        the second input of the amplifier is coupled to the first electrode of the current adjustment resistor.

8. An integrated circuit comprising a power converter as claimed in claim 1.

9. An apparatus comprising:
    a power converter as claimed in claim 1; and
    a battery configured to supply the first electrical power signal.

10. A method for converting a first electrical power signal into a second electrical power signal, the second electrical power signal comprising a voltage having a DC component, the method comprising
    generating a measurement voltage by adjusting the DC component of the voltage using a level shifter coupled to the voltage and producing the adjusted DC component of the voltage; and
    controlling operation of a power converter in accordance with the measurement voltage by comparing the adjusted DC component of the voltage from the level shifter with a reference voltage, wherein the power converter converts the a first electrical power signal into the second electrical power signal,
    wherein adjusting the DC component of the voltage comprises subtracting from the voltage a difference between a first reference voltage and a desired voltage.

11. The method of claim 10, wherein the power converter generates the output voltage between a first output terminal and a second output terminal, wherein generating a measurement voltage comprises
generating the measurement voltage between an intermediate node and the second output terminal by generating a reference current through a resistor coupled between the first output terminal and the intermediate node.

12. The method of claim 11, wherein generating a measurement voltage further comprises adjusting a resistance of the resistor.

13. The method of claim 12, wherein the resistor comprises a plurality of resistive elements connected in series, and wherein adjusting a resistance of the resistor comprises short-circuiting selected ones of the plurality of resistive elements.

14. The method of claim 12, wherein the resistor comprises a plurality of resistive elements connected in parallel between the first output terminal and the intermediate node, and wherein adjusting a resistance of the resistor comprises disconnecting selected ones of the plurality of resistive elements.

15. The method of claim 11, further comprising adjusting the reference current.

16. The method of claim 15, wherein:
the reference current is generated between the intermediate node and the second output terminal;
a main conductive path of a transistor and a current adjustment resistor are coupled in series between the intermediate node and the second output terminal; and
generating the reference current comprises controlling the transistor according to a comparison between a second reference voltage and a voltage across the current adjustment resistor.

17. The method of claim 16, wherein adjusting the DC component of the voltage comprises subtracting from the voltage a difference between a first reference voltage and a desired voltage, the method further comprising generating the second reference voltage from the first reference voltage.

18. The method of claim 10, further comprising supplying the first electrical power signal from a battery.

19. A power converter as claimed in claim 1, wherein
the control circuit further comprises a second comparator, the third terminal of the voltage level shifter coupled to an input of the second comparator, and
the control circuit is configured to control the operation of the power converter to maintain the voltage in a range of voltages derived from a first reference voltage coupled to the first comparator and a second reference voltage coupled to the second comparator.

20. The method of claim 10, wherein operation of the power converter is controlled to maintain the voltage in a range of voltages derived from the reference voltage and a second reference voltage.

* * * * *